(12) United States Patent
Raut et al.

(10) Patent No.: US 10,023,774 B2
(45) Date of Patent: Jul. 17, 2018

(54) ADHESIVE COMPOSITION AND USES THEREOF

(75) Inventors: Kundalik Ganpat Raut, Pune (IN); Manohar Virupax Badiger, Pune (IN); Sivaram Swaminathan, Pune (IN); Vivek Vitthal Kodgire, Pune (IN); Rajeshwari Shyamji Gour, Pune (IN)

(73) Assignee: COUNCIL OF SCIENTIFIC & INDUSTRIAL RESEARCH, New Delhi (IN)

(*) Notice: Subject to any disclaimer, the term of this patent is extended or adjusted under 35 U.S.C. 154(b) by 189 days.

(21) Appl. No.: 13/877,226

(22) PCT Filed: Oct. 3, 2011

(86) PCT No.: PCT/IN2011/000688
§ 371 (c)(1),
(2), (4) Date: Jun. 4, 2013

(87) PCT Pub. No.: WO2012/042543
PCT Pub. Date: Apr. 5, 2012

(65) Prior Publication Data
US 2013/0253093 A1    Sep. 26, 2013

(30) Foreign Application Priority Data
Oct. 1, 2010   (IN) .......................... 2361/DEL/2010

(51) Int. Cl.
*C09J 163/00*   (2006.01)
*C08L 63/00*   (2006.01)
*C08L 33/22*   (2006.01)

(52) U.S. Cl.
CPC ............. *C09J 163/00* (2013.01); *C08L 63/00* (2013.01); *C08L 33/22* (2013.01); *C08L 2666/04* (2013.01)

(58) Field of Classification Search
CPC ................................ C08L 63/00; C09J 163/00
USPC .......................................................... 523/451
See application file for complete search history.

(56) References Cited

U.S. PATENT DOCUMENTS

| | | | |
|---|---|---|---|
| 4,704,331 A * | 11/1987 | Robins et al. | 428/414 |
| 2005/0287304 A1* | 12/2005 | Iso et al. | 427/430.1 |
| 2007/0207410 A1* | 9/2007 | Leatherdale et al. | 430/280.1 |
| 2007/0212551 A1* | 9/2007 | Collins | 428/414 |
| 2007/0249778 A1* | 10/2007 | Clemens et al. | 524/502 |
| 2007/0293603 A1* | 12/2007 | Shepherd et al. | 523/467 |
| 2008/0139722 A1* | 6/2008 | Shefelbine et al. | 524/413 |
| 2008/0319105 A1* | 12/2008 | Lutz et al. | 523/201 |
| 2009/0220700 A1* | 9/2009 | Peres | 427/407.1 |
| 2009/0253586 A1* | 10/2009 | Nelson et al. | 506/9 |
| 2009/0288766 A1* | 11/2009 | Kramer et al. | 156/275.5 |
| 2010/0098910 A1* | 4/2010 | Naritomi et al. | 428/141 |

FOREIGN PATENT DOCUMENTS

WO    WO 2010011705 A1 *   1/2010   .............. C08L 63/00

* cited by examiner

*Primary Examiner* — Megan McCulley
(74) *Attorney, Agent, or Firm* — Abelman, Frayne & Schwab

(57) ABSTRACT

Disclosed herein is an adhesive composition for clutch disc application comprising of an epoxy resin of bisphenol A and epichlorohydrin, partially hydrogenated carboxylated nitrile butadiene rubber (HX-NBR) in solid form as a toughening agent in the ratio 80:20, and optionally with additives to obtain improved lap shear strength and cushioning properties.

1 Claim, No Drawings

ADHESIVE COMPOSITION AND USES THEREOF

FIELD OF THE INVENTION

The present invention relates to an adhesive composition to obtain improved lap shear strength and cushioning property for clutch applications.

Particularly, the present invention further relates to adhesive composition comprising an epoxy resin in the range of 50-90 parts by weight optionally with elastomer in the range of 2 to 50 parts by weight, toughening agent in the range of 2-50 parts by weight or additives n the range of 2-5 parts by weight.

BACKGROUND AND PRIOR ART OF THE INVENTION

A clutch in an automobile contains frictional material on a SS or MS plate/sheet. A clutch disc moves to and fro, it is engaged while moving and while disengaged, it is stationary. The friction material used n clutches is very expensive and is attached to the SS plate mechanically with rivets. But these rivets prevent the entire material from wearing off (entire material should be worn off, if not, material wasted on plate adds to expense), wearing off occurring only up to the rivet head. Thus only 40% wears off, 60% is wasted. Further these clutches contain springs for smooth operation of clutch when gears are changed.

Various remedies have been attempted to improve the performance of clutch, including silicon based applications. One of them is oriented towards compositions that can be used as adhesives which are replacement to the rivets used.

In general, epoxy based material are known for their excellent adhesion, chemical and heat resistance, good-to-excellent mechanical properties and very good electrical insulating properties. Epoxy adhesives are a major part of the class of adhesives called "structural adhesives" or "engineering adhesives". These high-performance adhesives are used in the construction of aircraft, automobiles, bicycles, boats, golf clubs, skis, snowboards, and other applications where high strength bonds are required. Further, epoxy adhesives can be used as adhesives for wood, metal, glass, stone, and some plastics.

Two critical characteristics which determine the commercial use of adhesive is the shear strength and the peel strength. Standard epoxy resin compositions based on bisphenol-A and epichlorohydrin compounded with various thermally active latent hardener and optionally accelerators, fillers, thixotropic auxiliaries and the conventional additives are hard and brittle in the cured state. They exhibit very high tensile strength but on exposure to impact, peel stress, they flake leading to failure of the adhesive joints.

References may be made to U.S. Pat. No. 6,645,341 discloses a two-component epoxy-based adhesive comprising a resin component and a curing agent where the resin component comprises an epoxy resin, a polymer polyol, and fumed silica. The curing agent comprises a polyoxyalkyleneamine, an amine terminated butadiene-acrylonitrile polymer, tris(2,4,6-dimethlaminomethyl)phenol, polyamide resin, silane and fumed silica. Further, Table 1 of said patent describes adhesives with various additives consisting of resin and curing agent in a molar ratio of 3:1 and Table 2 mentions that the ingredients of the curing agent portion of the adhesive described in Table 1 affect the lap shear strength and peel strength of the adhesive. However, said patent does not disclose the measurement of the lap shear strength of the adhesive composition at elevated temperature. The adhesive composition is useful for bonding of metals, plastics and composites and for functions such as laminating, honeycomb bonding, automotive assembly and construction assembly.

References may be made to patent application US2011039108, relates to a heat-curable structural adhesive composition of high impact strength comprising one or more epoxy-resins of glycidyl ethers of bisphenol A, toughening agents, a curing agent capable of cross linking the epoxy resins and an acetoacetoxy-functionalized compounds.

Attempts have been made to toughen the epoxy resin based adhesives for low temperature applications. But adhesive compositions for clutch application have a requirement of high temperature stable epoxy resin composition coupled with a high lap shear strength i.e. bond strength while simultaneously balancing the required cushioning property.

Very few compositions balance both these requirements; however, there is a gap in the art which can be filled by providing an improved adhesive composition that delivers improved lap shear strength without a compromise on its cushioning property. Moreover, a need is felt to provide a clutch disc adhesive composition such that it is worn off completely, thus making it an economically friendly option to mechanical rivets, soldering techniques for bonding, which retains such improved properties at higher temperatures.

OBJECTIVE OF THE INVENTION

Main objective of the present invention is to provide an adhesive composition.

Another objective of the present invention is to provide adhesive composition to obtain improved lap shear strength and cushioning property for clutch applications.

Yet another objective of the present invention is to provide adhesive composition comprising an epoxy resin in the range of 50-90 parts by weight optionally with elastomer in the range of 2 to 50 parts by weight, toughening agent in the range of 2-50 parts by weight or additives in the range of 2-5 parts by weight.

SUMMARY OF THE INVENTION

Accordingly, present invention provides adhesive composition comprising an epoxy resin in the range of 50-95 parts by weight optionally with elastomer in the range of 2 to 50 parts by weight, toughening agent in the range of 2-50 parts by weight or additives in the range of 2-5 parts by weight.

In yet another embodiment of the present invention, epoxy resin used is Bisphenol A type resin. In yet another embodiment of the present invention, elastomers used are selected from the group consisting of amino terminated butadiene acrylonitrile co-polymer (ATBN), carboxyl terminated butadiene acrylonitrile co-polymer (CTBN), vinyl terminated butadiene acrylonitrile co-polymer (VTBN), epoxy terminated butadiene acrylonitrile co-polymer (ETBN), polyether, polyester, polyacrylates, silicone or hydroxyl terminated poly butadiene (HTPB).

In yet another embodiment of the present invention, toughening agents used are selected from carboxyl terminated butadiene nitrile rubbers, acrylic polymers, partially hydrogenated carboxylated nitrile butadiene rubber (HX-NBR) or hydrogenated Nitrile Butadiene Rubber (HNBR).

In yet another embodiment of the present invention, additives used are selected from the group consisting of diluents, fillers or pigments.

In yet another embodiment of the present invention, diluents used are selected from the group consisting of diglycidyl ether of resorcinol, diglycidyl ether of cyclohexane dimethanol, diglycidyl ether of neopentyl glycol or triglycidyl ether of trimethylolpropane.

In yet another embodiment of the present invention, filler used are selected from the group consisting of silica-gels, Ca-silicates, phosphates, molybdates, fumed silica, bentonite, wollastonite, organoclays, aluminium-trihydrates, hollow-glass-micro spheres, hollow-polymeric microspheres or calcium-carbonate.

In yet another embodiment of the present invention, pigments used are selected from the group consisting of ferric oxide, brick dust, carbon black or titanium oxide.

In yet another embodiment of the present invention, said composition has the lap shear strength in the range of 9 to 15 kg/cm$^2$ and cushioning effect is in the range of 0.4-0.6 mm.

In yet another embodiment of the present invention, said adhesive composition is stable at a temperature in the range of 25 to 160° C. without compromising the cushioning effect.

In yet another embodiment of the present invention, the composition is in liquid form or in paste form.

In yet another embodiment of the present invention, said composition has following characteristics:
 a. Viscosity: 295,000 mPa·s
 b. Specific gravity: 1.66
 c. Lap shear strength: 322 kg/cm2
 d. Tg (DSC): 118° C.
 e. Cure conditions: @ 150° C. for more than 15 minutes.

In yet another embodiment of the present invention, one-pot process for the preparation of the adhesive composition comprising mixing compounded epoxy resin in the range of 50-90 parts by weight, elastomer in the range of 2 to 50 parts by weight, toughening agent in the range of 2-50 parts by weight, optionally with additives in the range of 2-5 parts by weight followed by mixing thoroughly and applied on the substrate previously treated with 2-5 parts by weight of coupling agent.

In yet another embodiment of the present invention, coupling agent used are selected from the group consisting of glycidyloxypropyl trialkoxy silane, mercaptopropyl trialkoxy silane or aminopropyl trialkoxy silane.

In yet another embodiment of the present invention, said composition provides improved lap shear strength and cushioning property for clutch applications.

In yet another embodiment of the present invention, adhesive composition is selected from a one-part or two part composition; preferably as a two part composition wherein one part adhesive system contain all the ingredients (base resin and elastomer) are in one pack whereas, in a two part adhesive system, the resin and the toughening agents are mixed just before the application. In yet another embodiment of the present invention, a one-pot process for the preparation of the adhesive composition comprising mixing compounded epoxy resin with toughening agent in the ratio 80:20 followed by mixing thoroughly and applied on the substrate previously treated with silane coupling agent.

DETAILED DESCRIPTION OF INVENTION

In an aspect the present invention relates to adhesive composition comprising of Henkel adhesive, an elastomer such as CTBN or ATBN optionally with a coupling agent and additives. In a preferred aspect, the current invention provides an adhesive composition comprising of an epoxy resin basically of bisphenol A and epichlorohydrin; and partially hydrogenated carboxylated nitrile butadiene rubber (HX-NBR) in solid form as a toughening agent in the ratio 80:20 optionally with additives to obtain improved lap shear strength and cushioning properties. The adhesive composition of the instant invention is stable at high temperature and has improved lap shear strength that can withstand temperature upto 0.160° C. without compromising the cushioning effect.

The present invention provides high temperature resistant epoxy based adhesive composition consisting of an epoxy resin component, elastomer, toughening agent, a coupling agent, optionally with additives such as diluents, fillers, pigments to obtain improved lap shear strength and cushioning properties for clutch disc application.

Examples of epoxy resin suitable for use in the present invention include HPA 1044 of Henkel; or polyepoxides formed by reacting epichlorohydrin with 4, 4 isopropylidene diphenol and having a molecular weight ranging from about 340 to about 10,000. Most preferably, the polyepoxides have a molecular weight range from about 330 to 560 and contain at least two oxirane groups; i.e., two epoxy groups; or include monofunctional and multifunctional glycidyl ethers of bisphenol A and bisphenol F, and cycloaliphatic epoxy resins or a combination thereof. The cycloaliphatic epoxies are preferably selected from non-glycidyl ether epoxides containing more than one 1.2 epoxy group per molecule such as 3,4-epoxycyclohexylmethyl-3,4-epoxycyclohexane carboxylate, which contains two epoxide groups that are part of the ring structures and an ester linkage, vinylcyclohexene dioxide, which contains two epoxide groups and one of which is part of the ring structure, 3,4-epoxy-6-methyl cyclohexyl methyl-3,4-epoxycyclohexane carboxylate and dicyclopentadiene dioxide. Glycidyl ether epoxies are used either separately or in combination with the non-glycidyl ether epoxides. These resins are selected from glycidyl ether epoxides containing more than one 1.2 epoxy group per molecule. A preferred epoxy resin of this type is Bisphenol A resin which includes 2,2-bis(4-hydroxyphenyl) propane-epichlorohydrin copolymer. These resins are generally prepared by the reaction of one mole of bisphenol A resin and two moles of epichlorohydrin. The preferred epoxy for the adhesive of the present invention is selected from HPA 1044 of Henkel or Bisphenol A resin. Bisphenol-A type resin is commercially available from Resolution Technology a., EPON 828, 828EL or 828XA. The epoxy resin component of the resin comprises from about 50 to about 90 weight percent of the resin component and, preferably, about 75 to about 85 weight percent of the resin component.

The elastomers of the present invention are selected from butadiene acrylonitrile copolymers namely amino terminated butadiene acrylonitrile co-polymer (ATBN), carboxyl terminated butadiene acrylonitrile co-polymer (CTBN), vinyl terminated butadiene acrylonitrile co-polymer (VTBN), epoxy terminated butadiene acrylonitrile co-polymer (ETBN), polyether, polyester, polyacrylates, silicone, hydroxyl terminated poly butadiene (HTPB) and such like.

The adhesive composition comprises silane coupling agents, selected from, but not limited to glycidyloxypropyl trialkoxy silane, mercaptopropyl trialkoxy silane, aminopropyl trialkoxy silane, and such like. In addition, organo-silanes may contain moieties, such as, for example, ester, vinyl, methacryloxy, sulfur, amino, ureido, isocyanurate, and isocyanato groups.

The toughening agents are primarily the polymers other than epoxy resins capable of increasing the toughness of the epoxy resin. The toughness is measured by the peel strength of the eoxy resin. Typical toughening agents are selected from carboxyl terminated butadiene nitrile rubbers, acrylic polymers and copolymers etc. However, the unsaturated polymers have low resistance to heat, water, and impact. To withstand the high temperature and high peel strength, the toughening agents in the present invention is selected from partially hydrogenated carboxylated butadiene nitrile rubbers in the range of 20 wt %.

Hydrogenated Nitrile Butadiene Rubber (HNBR) is a special class of nitrile rubber (NBR) that is hydrogenated to increase saturation of the butadiene segment of the carbon polymer backbone. Substantial improvements to the material properties, over that of a nitrile rubber (NBR), include greater thermal stability, broader chemical resistance, and greater tensile strength. Moreover, addition of carboxylic acid groups to the NBR polymer's backbone significantly alters processing and cured properties. It also results is a polymer matrix with significantly increased strength, measured by improved tensile, tear, modulus and abrasion resistance.

Present invention provides an adhesive composition comprising of HPA 1044 of Henkel and an elastomer CTBN or ATBN optionally with a coupling agent and additives having following specifications;
a. Viscosity: 295,000 mPa·s
b. Specific gravity: 1.66
c. Lap shear strength: 322 kg/cm2
d. Tg (DSC): 118° C.
e. Cure conditions: @ 150° C. for more than 15 minutes The epoxy resin in the adhesive composition of the invention is in the range of 50-90 parts by weight and elastomer is in the range of 2-50 parts by weight. The coupling agent is in the range of 2-5 parts by weight of the adhesive composition.

The present invention provides an adhesive composition for clutch disc application comprising of an epoxy resin basically of bisphenol A and epichlorohydrin; and partially hydrogenated carboxylated nitrile butadiene rubber (HX-NBR) in solid form as a toughening agent in the ratio 80:20 optionally with additives with improved lap shear strength and cushioning properties.

The epoxy resin is in the range of 50-90 parts by weight and the toughening agent n the range of 2-50 parts by weight optionally with additives in the range of 2-5 parts by weight The adhesive composition of the instant invention is stable at a temperature in the range of 25° C. to 160° C. and has a lap shear strength not less than 10 kg/cm$^2$ with an average cushioning of 0.4-0.6 mm.

The diluent may be added to the adhesive composition to control the flow characteristics and is selected from diglycidyl ether of resorcinol, diglycidyl ether of cyclohexane dimethanol, diglycidyl ether of neopentyl glycol, triglycidyl ether of trimethylolpropane.

Fillers may include adhesion promoters, corrosion inhibitors and rheology controlling agents and may be selected from silica-gels, Ca-silicates, phosphates, molybdates, fumed silica, clays such as bentonite or wollastonite, organoclays, aluminium-trihydrates, hollow-glass-microspheres; hollow-polymeric microspheres and calcium-carbonate.

Pigments may include inorganic or organic pigments including ferric oxide, brick dust, carbon black, titanium oxide and the like.

The adhesive composition of the instant invention may be a one-part or two part composition; preferably as a two part composition.

The invention provides a one-pot process for the preparation of the adhesive composition comprising mixing compounded epoxy resin with toughening agent in the ratio 80:20. The contents are mixed thoroughly and applied on the substrate previously treated with silane coupling agent.

The physical properties of HPA 1044 (Henkel Adhesives) used in the present invention are given in Table 1 below:

TABLE 1

| Properties | Observation |
|---|---|
| Appearance | Brownish Grey Paste |
| Viscosity Brookfield RV #7@10 rpm | 295,000 mPa · s |
| HAAKE Viscosity (RS-1, CS35/2-Ti) @ 20 s$^{-1}$ | 97,000 mPa · s |
| HAAKE Viscosity (RS-1, CS35/2-Ti) Thixo ratio (2 s$^{-1}$/20 s$^{-1}$) | 2.23 |
| Specific Gravity | 1.66 |
| Lap Shear Strength (GB Steel, 0 gap@ 150° C. × 30 min) | 32.2 N/mm$^2$ |
| Tg (DSC) | 118° C. |

The adhesive of the present invention can be applied as liquid, paste, and semi-solid or solid that can be liquefied upon heating, or the adhesive may be applied as a spray. It can be applied as a continuous bead, in intermediate dots, stripes, diagonals or any other geometrical form that will conform to forming a useful bond. Preferably, the adhesive composition is in a liquid or paste form. The composition may be used as a metal-metal adhesive, metal-carbon fiber adhesive, carbon fiber-carbon fiber adhesive, metal-glass adhesive, carbon fiber-glass adhesive.

The adhesive composition of the present invention contains low amount of volatile organic compounds thus providing an environment friendly, economical option for the mechanical rivet. Such compositions of the invention find use in clutch disc applications.

EXAMPLE

Following examples are given by way of illustration therefore should not be construed to limit the scope of the present invention in any manner.

Example 1

| Ingredients | Parts by weight |
|---|---|
| HPA-1044 | 95 |
| CTBN (elastomer) | 5 |

APTES (Aminopropyl triethoxy silane) is used as coupling agent.

Example 2

| Ingredients | Parts by weight |
|---|---|
| HPA-1044 | 85 |
| ATBN | 15 |

APTES (Aminopropyl triethoxy silane) is used as coupling agent.

Example 3

| ingredients | Parts by weight |
|---|---|
| HPA-1044 | 80 |
| HXNBR | 20 |

MEK (Methyl ethyl ketone) is used to dissolve these ingredients.
APTES (Aminopropyl triethoxy silane) is used as coupling agent.

Test for Lap Shear Strength and Cushioning

The lap shear strength (LSS) test specimens were prepared as per the ASTM D1002. For this the test specimens in the form of strips of dimension 100 mm in length and 25 mm in width were prepared from mild steel (1.6 mm thick) and organo-metallic friction material (4.2 mm thick). Test specimens, were cleaned to remove oil, dust and grease materials from the surface. Amino functional silane was applied over the cleaned surface in an area of one inch by half inch. An adhesive composition was prepared by mixing the ingredients as given herein. Silane coated test specimens were bonded together with this adhesive and cured at 150° C. for 90 minutes. Testing was done at 150° C. after seven days of post curing at 27° C.

Test Results for Lap Shear Strength and Cushioning

I) Measurement of Lap Shear Strength

The strips bonded with adhesive were evaluated at 27° C. and at 150° C. for lap shear strength using a Universal tensile tester (Instron) as per procedure in ASTM D 1002-05.

II) Measurement of Cushioning Property

The adhesive bonded test specimen was kept in between two stainless steel plates and a load of 10 $kg/cm^2$ was applied. The gap between the plates was measured before and after the application of the load. From this the cushion parameters were calculated.

TABLE 2

Test results for lap shear strength and cushioning

| | LSS ($kg/cm^2$) @ 150° C. | Cushioning (mm) |
|---|---|---|
| Example 1 | 15 | 0.08 |
| Example 2 | 9.5 | 0.15 |
| Example 3 | 11 | 0.5 |

Advantages of the Invention

1. Adhesively bonded clutch disc provide 100% utilization of the friction material.
2. There is no loss of friction material.
3. Life time of clutch disc is increased.
4. There is a reduction in the overall weight of clutch disc.
5. The process for the preparation of adhesively bonded clutch disc is easier and economical.

We claim:

1. An adhesive composition consisting of from 2-20 parts by weight ATBN, from 2-5 parts by weight of an amino propyl triethoxy silane coupling agent, and the remainder an epoxy resin.

* * * * *